United States Patent [19]
Nukui et al.

[11] Patent Number: 6,098,455
[45] Date of Patent: Aug. 8, 2000

[54] THERMAL TYPE FLOWMETER

[75] Inventors: Kazumitsu Nukui, Fujisawa; Toshiharu Saito, Ageo; Tokudai Neda, Tokyo, all of Japan

[73] Assignee: Tokyo Gas Co., Ltd., Tokyo, Japan

[21] Appl. No.: 08/537,279

[22] Filed: Sep. 29, 1995

[30] Foreign Application Priority Data

Dec. 12, 1994 [JP] Japan ..................................... 6-307565

[51] Int. Cl.⁷ ....................................................... G01F 1/68
[52] U.S. Cl. ......................................................... 73/204.26
[58] Field of Search ........................... 73/204.26, 204.11, 73/204.25, 204.27

[56] References Cited

U.S. PATENT DOCUMENTS

| | | | |
|---|---|---|---|
| 3,891,391 | 6/1975 | Boone | 73/204 |
| 4,542,650 | 9/1985 | Renken et al. | 73/204 |
| 5,108,193 | 4/1992 | Furubayashi | 73/204.11 |
| 5,237,867 | 8/1993 | Cook, Jr. | 73/204.26 |

*Primary Examiner*—Richard Chilcot
*Assistant Examiner*—Jewel Artis
*Attorney, Agent, or Firm*—Armstrong, Westerman, Hattori, McLeland & Naughton

[57] ABSTRACT

A miniaturized, inexpensive flowmeter capable of accurately measuring a flow rate comprises a flow rate detector including a plurality of thermal type flow rate detector elements mounted on a support plate, a power source for applying power to the flow rate detector, and a signal processor for calculating the flow rate from supplied power.

13 Claims, 13 Drawing Sheets

THERMAL TYPE FLOWMETER

BACKGROUND OF THE INVENTION

1. Field of the Invention

This invention relates to a flowmeter for measuring the flow rate of a fluid flowing in a pipe conduit. More particularly, the invention relates to a flowmeter capable of measuring the accurate flow rate even in a portion where the state of flow is turbulent.

2. Description of the Related Art

To measure the flow rate of a fluid in a pipe, the fluid is made to run as a laminar flow or as a grown turbulent flow such that the flow rate distribution exhibits a known pattern; the flow rate at a certain point is measured; and the flow value is calculated, based on the measured value, the pattern of flow rate distribution and the cross-sectional area. In order to make a fluid in a pipe to run as a laminar flow or a grown turbulent flow, it is normally required for the pipe to have a straight portion over a length ten times the diameter of the pipe or more at a portion where a flowmeter is inserted. However, when the fluid to be measured flows in an ancillary pipe, such as conduit for air or gas, conduit for refrigerant or cooling water, or the like, pipes rarely have such a straight portion ten times longer its diameter or more, and it is difficult to obtain a laminar flow or a grown turbulent flow, which makes it difficult to detect the accurate amount of the flow with this approach.

Therefore, for measurement of a flow without a sufficient length of a straight pipe portion, there was frequently used a volumetric flowmeter, such as wet type flowmeter or diaphragm type meter, capable of detecting the flow amount, not relying on a flow rate distribution. Alternatively, there was used a correlative flowmeter combining some flowmeters to suppress the output variation caused by changes in flow rate distribution.

Although such a volumetric flowmeter does not require a straight pipe portion, it has drawbacks caused by its own structure, namely, (1) slow response, (2) large pressure loss, and (3) difficult assembly thereof into an existing pipe; and its use is possible only under a limited condition. In regard of conventional correlative flowmeters, they need a complicated signal processor for averaging outputs, calculating a correlative signal, and so forth.

Figure 16A:
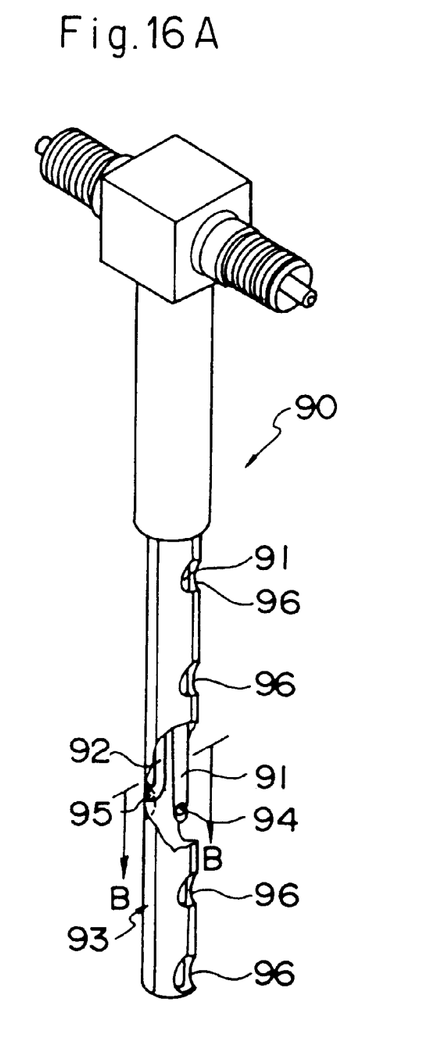
FIG. 16A is a partly cut-out, perspective view of an existing Pitot-tube type correlative flowmeter.
Figure 16B:
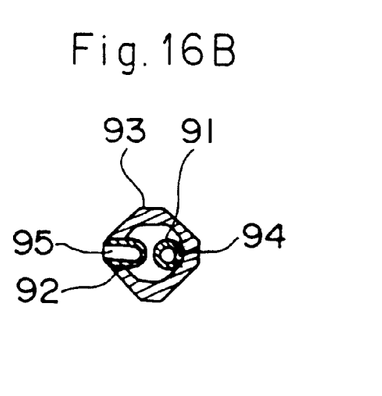
FIG. 16B is a cross-sectional view taken along the B—B line of FIG. 16A.

The Pitot-tube type flowmeter disclosed in Japanese Patent Laid-Open No. 60-7207(1985) is an excellent correlative flowmeter. FIG. 16A is a partly cut-out, perspective view showing a structure of the Pitot-tube type flowmeter, and FIG. 16B is a cross-sectional view taken along the B—B line of FIG. 16A. The flowmeter comprises a Pitot's tube 90 including a high-pressure pipe 91 and a low-pressure pipe 92. The Pitot's tube 90 is housed in a hollow sheath 93. A high-pressure port 94 opens at the tip end of the high-pressure pipe 91 of the Pitot's tube 20, and a low-pressure port 95 opens at the tip end of the low-pressure pipe 92. The low-pressure port 95 is located on the axial line of a conduit in which the Pitot's tube 20 is inserted. The sheath 93 has a plurality of upstream ports 96 such that pressures of a fluid detected by the upstream ports 96 are averaged and applied to the high-pressure port 94 of the high-pressure pipe 91. Therefore, the flowmeter using the Pitot's tube can output with remarkably better S/N ratio than a single Pitot's tube, and stable outputs can be obtained with the flowmeter even when its straight pipe portion is only around several times its diameter.

Although the Pitot-tube type flowmeter does not require a complicated signal processor because of the averaging operation inherent to its structure, it still involves drawbacks inherent to the structure of the Pitot-tube type flowmeter, namely, (1) narrow detectable range of flow rates, (2) slow response, (3) high cost, and (4) the need for an expensive differential oscillator for obtaining an electric output signal.

It is therefore an object of the invention to provide a flowmeter that can be inserted in existing pipe conduits in which the flow is turbulent, has wide detectable range of flow rates and quick response, can be fabricated at low cost, and causes only small pressure loss in fluid.

SUMMARY OF THE INVENTION

According to the invention, there is provided a thermal type flowmeter comprising thermal type flow rate detector means including a plurality of thermal type flow rate detector elements arranged on a support plate; a power source for supplying power to the thermal type flow rate detector elements; and arithmetic processor means for calculating a flow amount on the basis of supplied power.

Each thermal type flow rate detector element may be an element made by bonding a heater wire onto a semiconductor substrate.

The thermal type flow rate detector elements may be coupled in parallel, the power source may be a constant voltage source, and the arithmetic processor means may be means for calculating the flow amount on the basis of a voltage drop of a resistor coupled in series with the thermal type flow rate detector means.

Alternatively, the thermal type flow rate detector elements may be coupled in series, the power source may be a constant current source, and the arithmetic processor means may be means for calculating the flow amount on the basis of on a voltage drop of the thermal type flow rate detector elements coupled in series.

The flowmeters according to the invention, arranged to calculate a flow amount based on outputs from a plurality of flow rate detector means, can detect the flow amount of a fluid in a turbulent condition.

DETAILED DESCRIPTION OF THE PREFERRED EMBODIMENTS

Figure 3A:
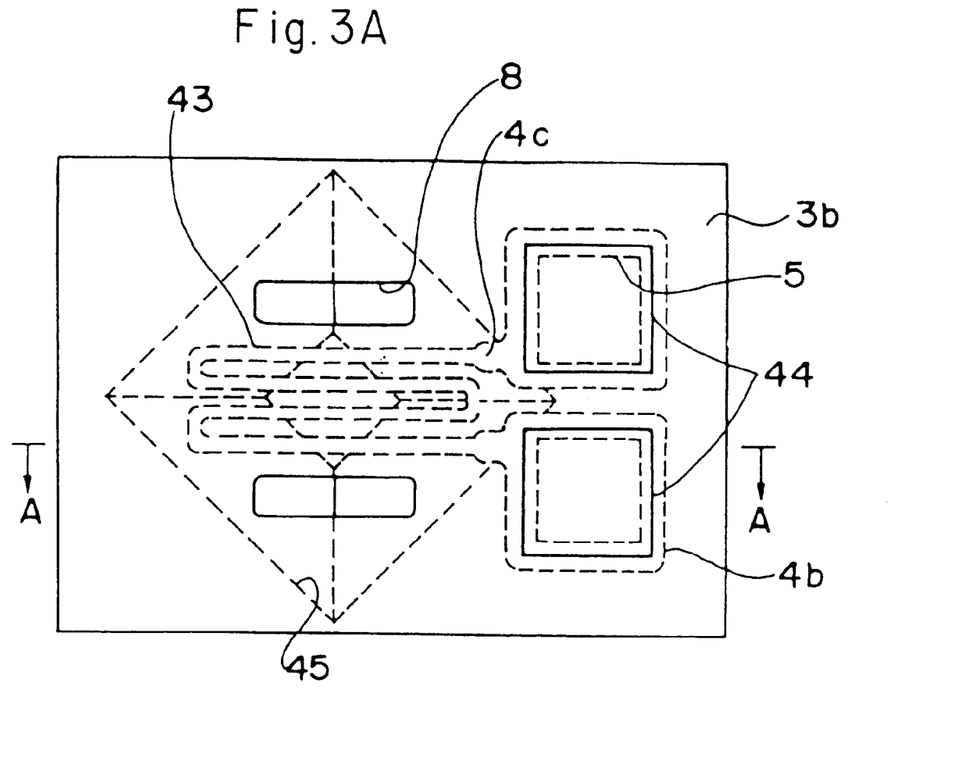
FIG. 3A is a plane view of a thermal type flow rate detector element used in the thermal type flowmeter.
Figure 3B:
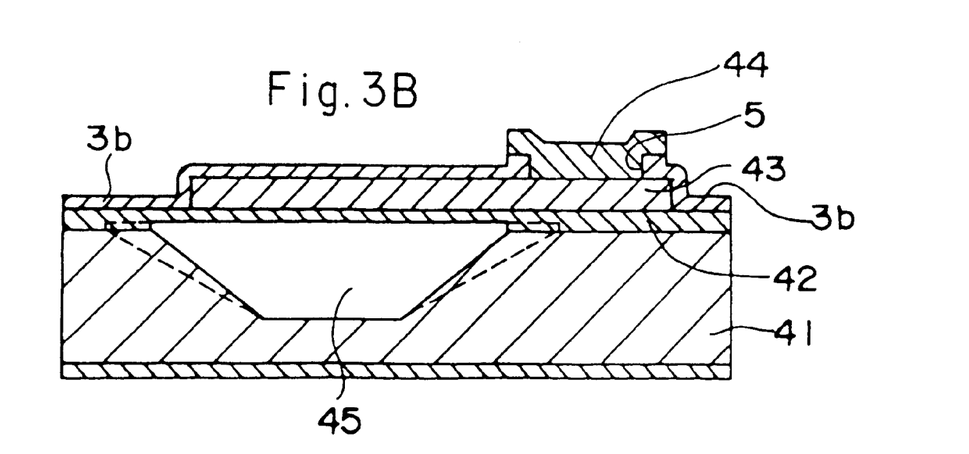
FIG. 3B is a cross-sectional view of the thermal type flow rate detector element of FIG. 3A.

A thermal type flowmeter according to the invention is described below with reference to the drawings. The flowmeter according to the invention is characterized in the use of thermal type flow rate detector elements which can be mass-produced by using a micro-machining technique for semiconductors. In regard of thermal type flow rate detector elements, the present Applicant formerly made an invention entitled "thermal type microflow-sensor and its manufacturing method" for which Japanese Patent Application No. 6-190319 was filed on Aug. 12, 1995. As shown in FIG. 3, the thermal type microflow-sensor (thermal type flow rate detector element) is made by fabricating a heater wire 43 of polysilicon on a protective film 42 stacked on a semiconductor substrate 41 of silicon or other material via a heat insulating structure 45. The thermal type flow rate detector element, labelled with 4, is disposed such that the plane bearing the heater wire 43 extends in parallel with and exposed to the flow, and measures the flow amount utilizing the characteristic of the heater wires 43, namely, a decrease in resistance of the heater wire 43 by transferring heat to the fluid. Provided on an end portion of the heater wire 43 is a contact pad 44.

The thermal type flow rate detector element 1 mass-produced by a semiconductor microprocessing technique has a wide detectable range of flow rates, for example, over 3.5 decimal positions of 0.005 m/s to 40 m/s and a quick response on the order of milliseconds, and can be fabricated in a microscopic area of about 2 mm×2 mm×0.3 mm. Its power consumption is as low as several mW and its manufacturing cost is less than one dollar when mass-produced. The present invention uses a plurality of these thermal type flow rate detector elements in combination, to make a flowmeter capable of measuring the flow amount even under a condition where the length of the longest straight pipe portion is only several times the diameter of the pipe.

Figure 1:
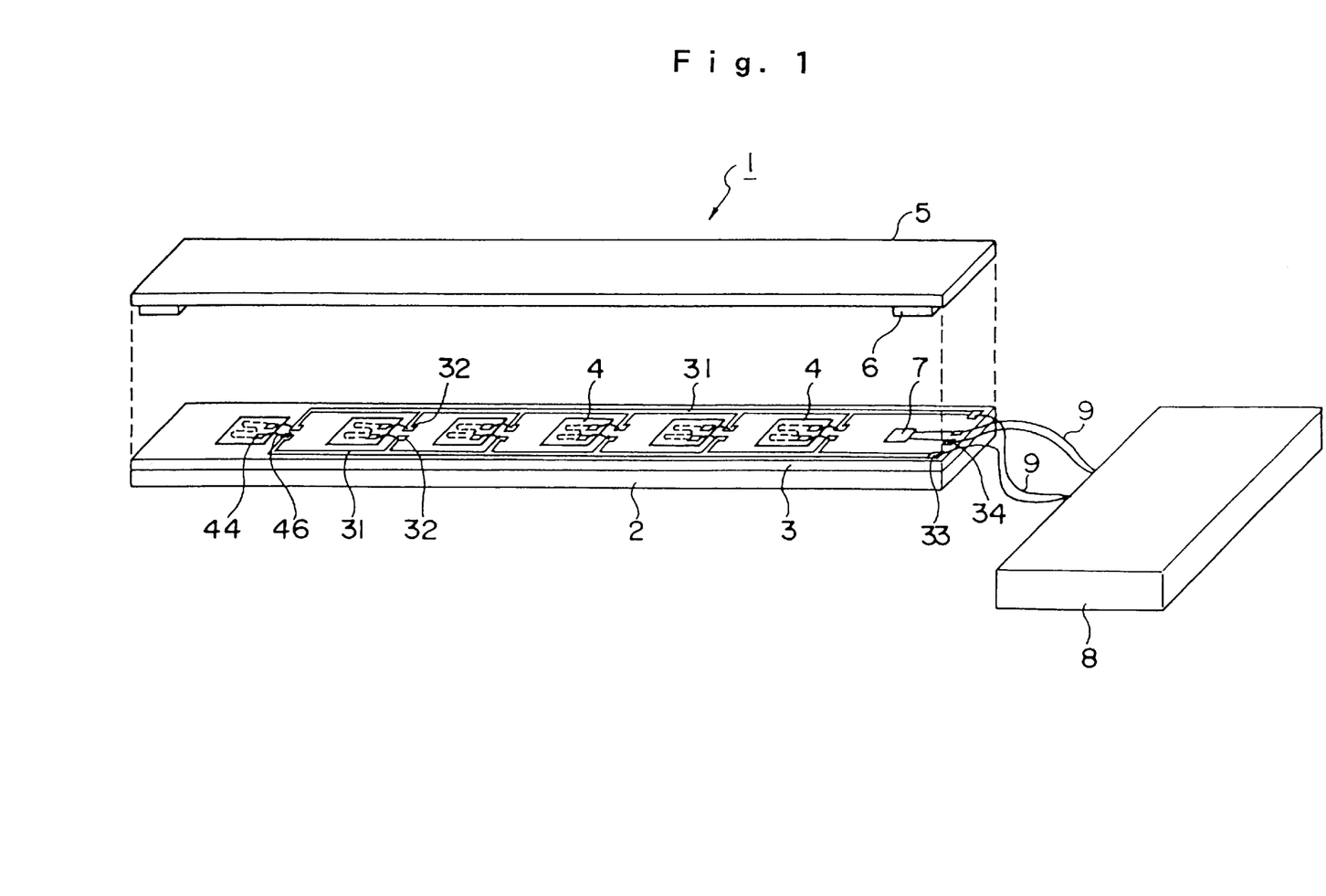
FIG. 1 is a perspective view of a thermal type flowmeter according to the invention.
Figure 2:
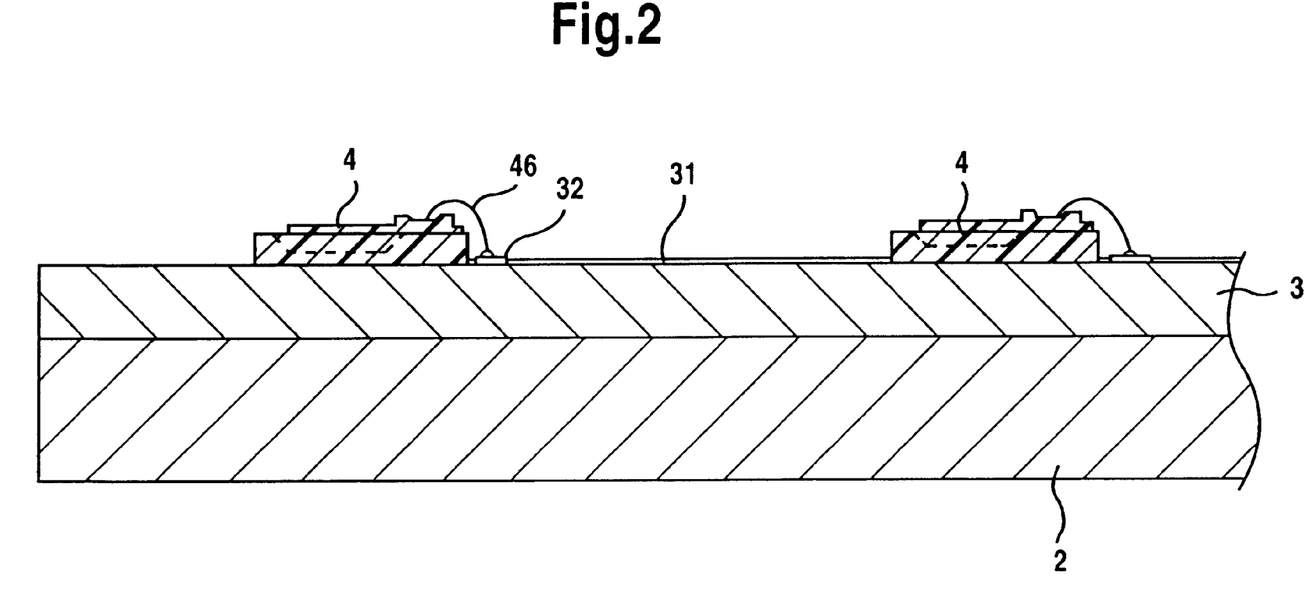
FIG. 2 is a fragmentary cross-sectional view of the thermal type flowmeter of FIG. 1.

FIG. 1 and FIG. 2 schematically show a thermal type flowmeter taken as a first embodiment of the invention. FIG. 1 is a perspective view and FIG. 2 is a fragmentary cross-sectional view. The thermal type flowmeter according to the embodiment comprises a thermal type flow rate detector 1 made by aligning a plurality of the thermal type flow rate detector elements 4 along a straight line and coupling these elements in parallel, a power source, and a signal processor 8 including arithmetic processor means and display means.

The thermal type flow rate detector 1 comprises a support member 2 made of a hard material such as steel or stainless steel, a glass substrate 3 supported by the support member 2, a plurality of thermal type flow rate detector elements 4 bonded to the glass substrate 3, a protective cover 5 for preventing an operator from touching surfaces of the detector elements 4 when he mounts the detector, a isolating member 6 for making a fluid flow path between the detector elements 4 and the protective cover 5, and a temperature detector element 7 provided on the glass substrate 3 to detect the temperature of a fluid. Provided on the surface of the glass substrate 3 are a wiring pattern 31 made of a metal film stacked by vapor deposition and partly removed by photo-lithography and etching, connecting pads 32 in direct contact with the wiring pattern 31, and a connecting terminal pad 33. Further provided on the surface of the glass substrate 3 is a pad 34 in contact with the temperature detecting element 7. The glass substrate 3 may be made of any appropriate non-conductive material other than glass.

The connecting terminal pad 33 and the pad 34 in contact with the temperature detecting element 7 are coupled to the signal processor 8 by connecting wires 9 having a known connector not shown.

Figure 4:
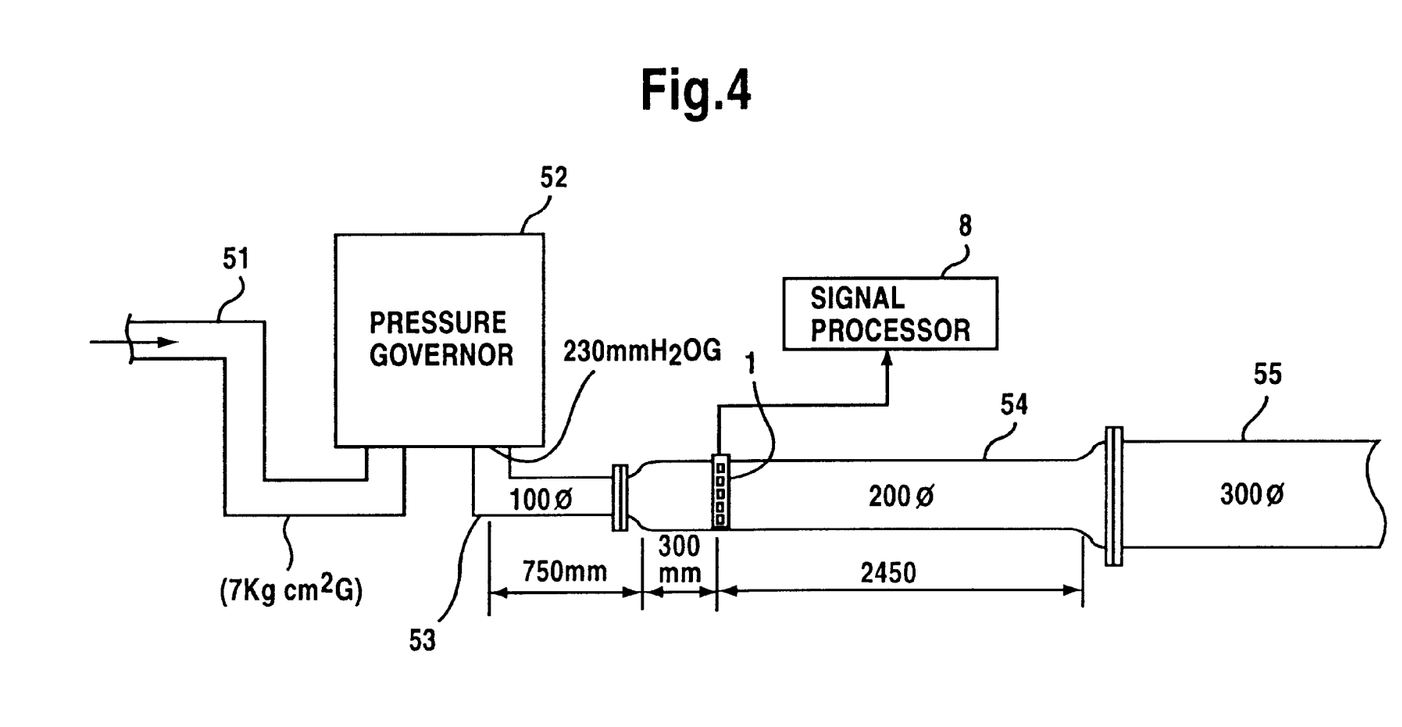
FIG. 4 is a schematic view showing how to use the thermal type flowmeter according to the invention.

FIG. 4 shows an example of mounting the thermal type flow rate detector 1. A gas pipe line for mounting the thermal type flow rate detector 1 comprises a high-pressure conduit 51 which is supplied with a gas of the gauge pressure of 7 kg/cm$^2$, a pressure governor 52 which reduces the incoming gas pressure into the water-gauge pressure of 230 mm, a conduit 53 with the diameter of 100 mm and the length of 750 mm connected at one end to the outlet of the pressure governor 52, a conduit 54 with the diameter of 200 mm and the length of 2750 mm connected to the conduit 53, and a conduit 55 with the diameter of 300 mm connected at one to the conduit 54. The thermal type flow rate detector 1 is inserted into the conduit 54 in the axial direction through a hole made at a point of the conduit 54 distant by 300 mm from the boundary between the conduits 53 and 54 where the diameter increases from 100 mm to 200 mm. The thermal type flow rate detector 1 is inserted into the conduit 54 such that the surface of each detector element 4 is aligned in parallel with the flowing direction of the fluid. At this mounting point, the gas flow exhibits complicated turbulence.

Figure 5:
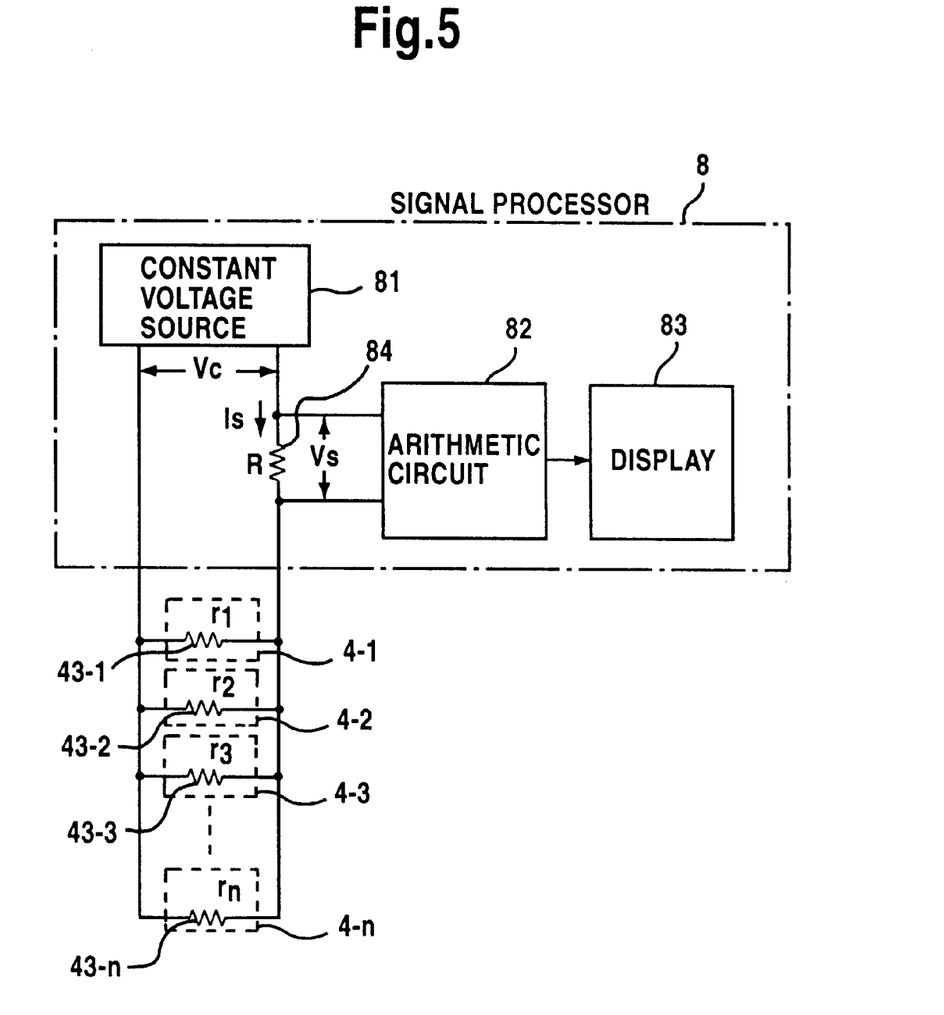
FIG. 5 is a circuit arrangement for coupling the detector elements of the thermal type flowmeter according to the invention.

FIG. 5 shows a circuit arrangement of the system. In this example, the thermal type flow rate detector elements 4-1 through 4-n are in parallel connection. The signal processor 8 includes a constant voltage source 81, arithmetic circuit 82, display 83 and voltage detecting resistor 84. An output voltage Vc is applied to the heater wire 43 of each element from the constant voltage source 81 through the voltage detecting resistor 84. The current I flowing in the voltage detecting resistor 84 is expressed by EQUATION 1 shown below.

$$I_s = \frac{V_c}{R + \dfrac{1}{\dfrac{1}{r_1} + \dfrac{1}{r_2} + \dfrac{1}{r_3} \ldots + \dfrac{1}{r_n}}} \quad (1)$$

When the composite resistance of the heater wires 43-1 to 43-n is r', the voltage Vs appearing at opposite ends of the resistor 84 is expressed by EQUATION 2 shown below.

$$V_s = I_s \cdot R = \frac{V_c}{R+r'} \cdot R = V_c \cdot \frac{R}{R+r'} \quad (2)$$

That is, the voltage Vs appearing at opposite ends of the resistor 84 is an output depending upon changes in composite resistance r' of the heater wires 43-1 to 43-n. By using the circuit arrangement, even when one or more of the heater wires 43-1 to 43-n of the flow rate detector elements 4-1 to 4-n are cut off, measurement can be continued by correcting the value of the composite resistance.

A constant voltage Vc is applied to the flow rate detector elements 4-1 to 4-n such that their heater wires 43-1 to 43-n are heated to 100° C. approximately. When the temperature of the heater wires 43-1 to 43-n decreases due to removal of a certain amount of heat from the heater wires 43-1 to 43-n which are contacted by the flow of the fluid, the composite resistance of the heater wires decreases, and the current flowing in the detector elements increases. Since the detector elements are coupled in parallel, the current flowing in the constant voltage source is equal to the sum of currents in the detector elements 4. Therefore, by taking the value of the current in the constant voltage source as the output of the flowmeter, the mean value of outputs of the flow rate detector elements 4 can be obtained structurally.

Figure 6:
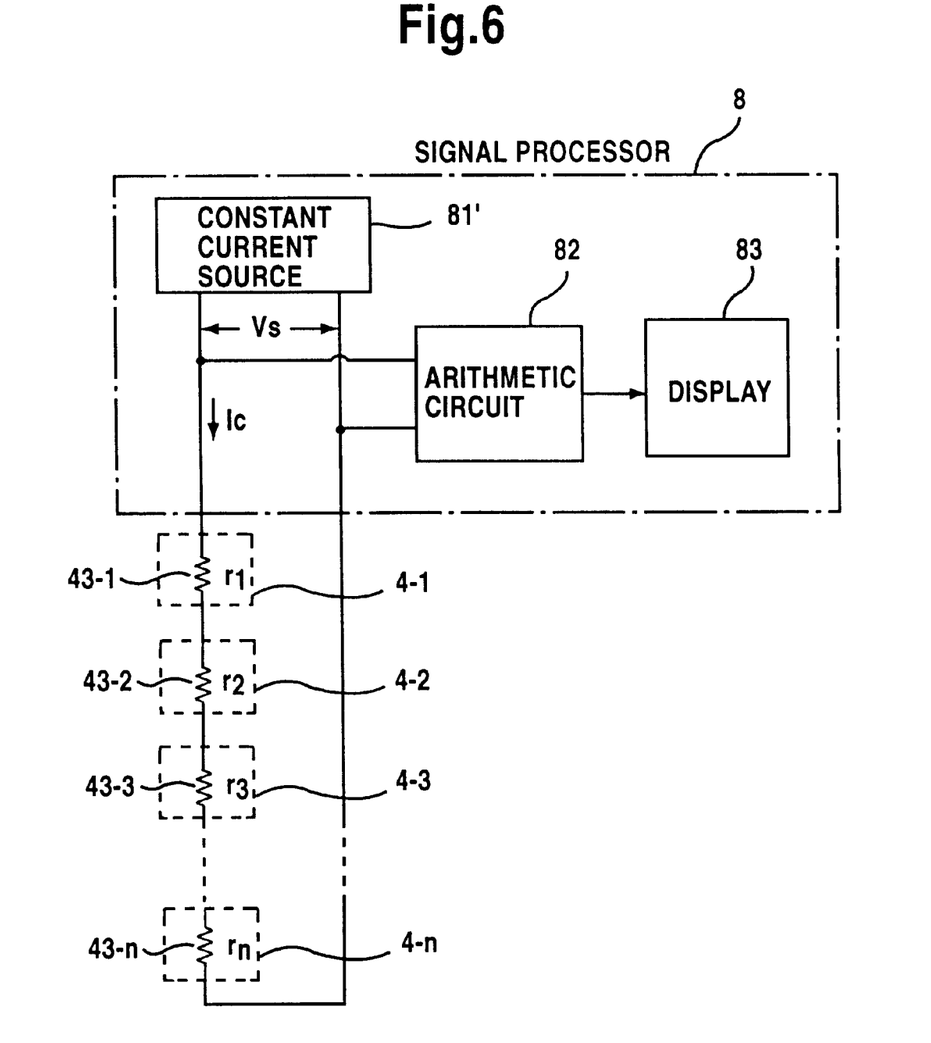
FIG. 6 is another circuit arrangement for coupling the detector elements of the thermal type flowmeter according to the invention.

FIG. 6 shows a circuit arrangement with serial connection of the thermal type flow rate detector elements 4-1 to 4-n. The signal processor 8 includes a constant current source 81', arithmetic circuit 82, and display 83. The heater wire 43 of each element 4 is supplied with an output current Ic from the constant current source 81'. The voltage Vs at opposite ends of the heater wires 43-1 to 43-n is expressed by EQUATION 3 shown below.

$$V_s = I_c \cdot (r_1 + r_2 + r_3 \ldots + r_n) \quad (3)$$

That is, the voltage Vs appearing at opposite ends of the heater wires 43-1 to 43-n is a large output corresponding to a variation which depends on the composite resistance of the heater wires 43-1 to 43-n.

Figure 7A:
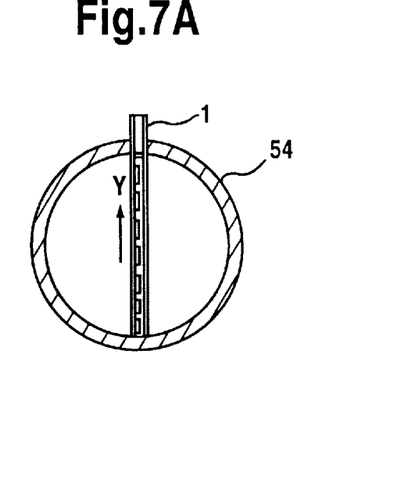
FIG. 7A and FIG. 7B are cross-sectional views showing aspects of use of the detector of the thermal type flowmeter.
Figure 7B:
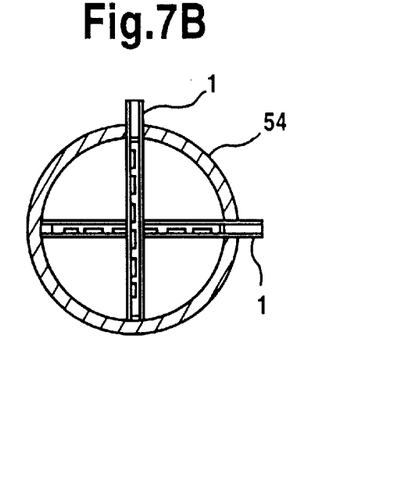

FIG. 7A and FIG. 7B show examples of the positional relation of the thermal type flowmeter 1 with a pipe conduit. Both these figures are cross-sectional views taken along a plane normal to the axial line of the conduit 54. The example of FIG. 7A disposes the thermal type flowmeter 1 in one direction, Y direction, for example, along the cross-sectional plane of the conduit 54. This is effective when the flow rate distribution deflects in only one direction. In the example of FIG. 7B, two thermal type flowmeters 1 are disposed in two orthogonal directions along the cross-sectional plane of the conduit 54. This is effective when the flow rate distribution deflects in all directions.

When the flow rate distribution is substantially symmetric about the center in the pipe at the position of the thermal type flow rate detector 1 inserted in the pipe conduit 54, distances of the thermal type flow rate detector elements 4 disposed on the substrate 3 and exerting linear outputs from the center of the pipe can be determined by the following equation.

$$r_i = R \sqrt{\frac{2i-1}{2N}} \quad (i = 1, 2, \ldots, N)$$

where $r_i$ is the distance from the center of the pipe to the thermal type flow rate detector element at the i-numbered position from the center of the pipe, R is the radius of the pipe, and N is the total number of the thermal type flow rate detector elements disposed along the radius.

By providing N thermal type flow rate detector elements 4 at positions distant by $r_i$, the mean flow rate in the pipe with the radius R can be readily obtained as the average of outputs of the thermal type flow rate detector elements 4.

Figure 8:
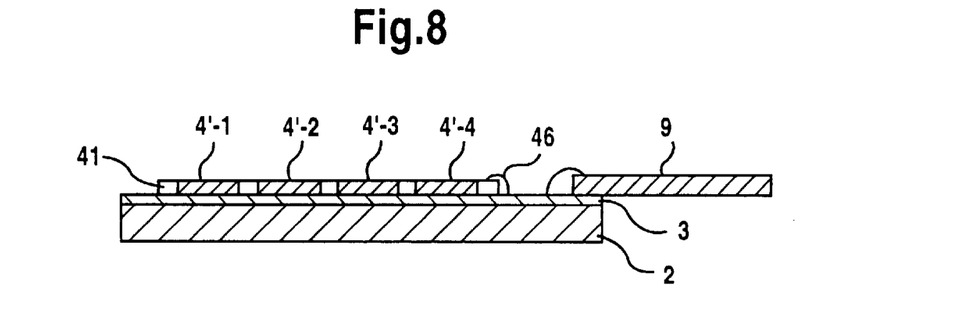
FIG. 8 is a cross-sectional view of a modified design of the flow rate detector in the thermal type flowmeter according to the invention.

FIG. 8 shows another thermal flowmeter 1 having another arrangement suitable for use in small-diameter pipes. In this example, a plurality of thermal type flow rate detector elements 4-1 to 4-n are made on a single semiconductor substrate 41. This arrangement remarkably alleviates the process for bonding respective elements and the process for connecting the elements 4 to the connecting pads 32 of the wiring 31 by gold wires 46, and hence improves the reliability.

Any member inserted in a fluid flowing at a high speed receives a periodical force from the fluid. Particularly when the member has a uniform cross-section, it is very likely to be affected by a fluid vibration caused by von Karlman's vortex street. This kind of vibration disturbs an accurate measurement by a flowmeter, and decreases the long-life reliability of the flowmeter. An effective approach for avoiding such vibrations would be the method of varying the thickness of the support member in a constant rate from the tip end to the base end of the support member. This method can suppress generation of vibrations of the support member and the thermal type flow rate detector in a fluid, and ensures an accurate measurement of flow rates.

Figure 9:
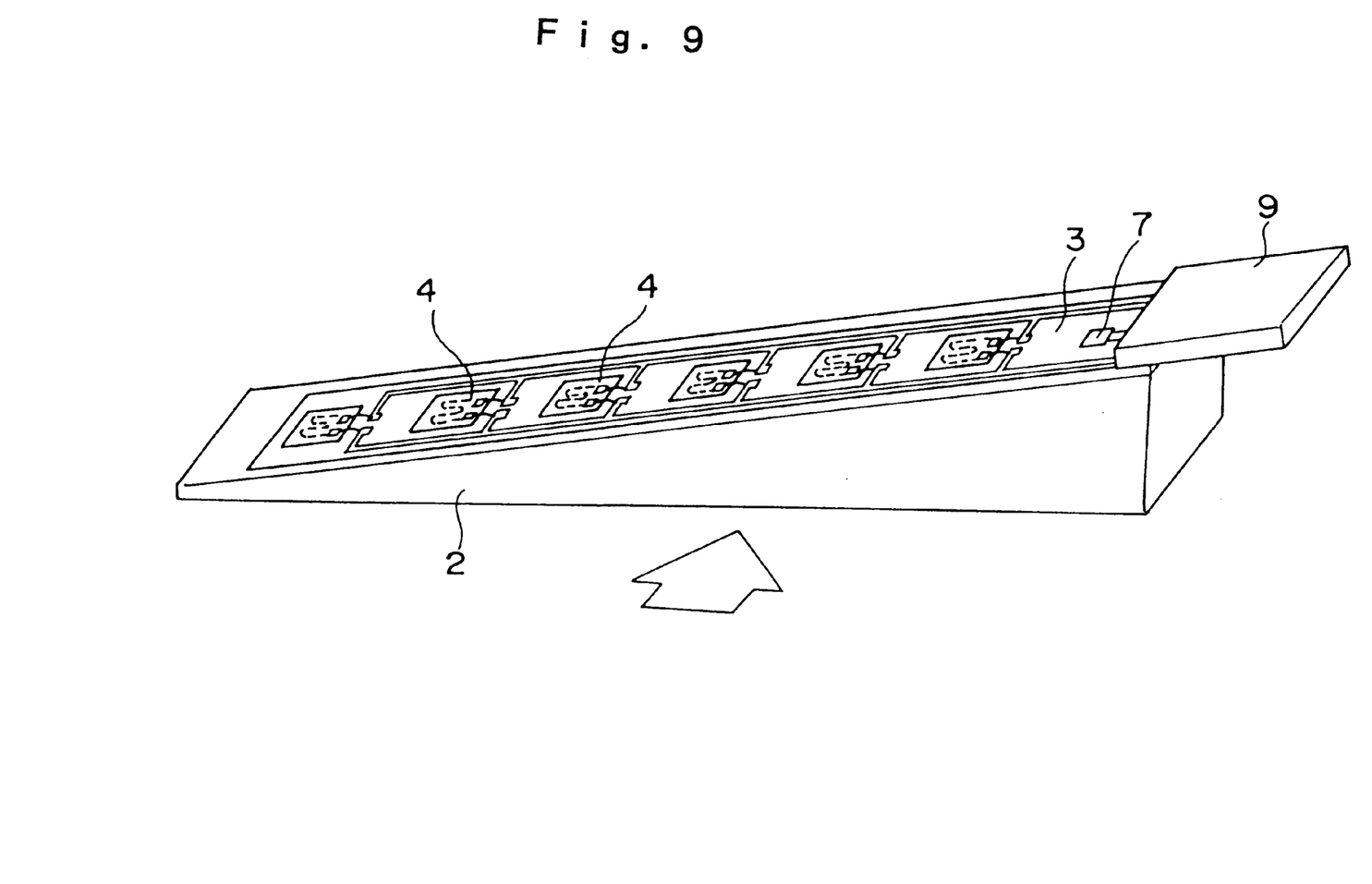
FIG. 9 is a perspective view of a modified support member for the flow rate detector.
Figure 10:
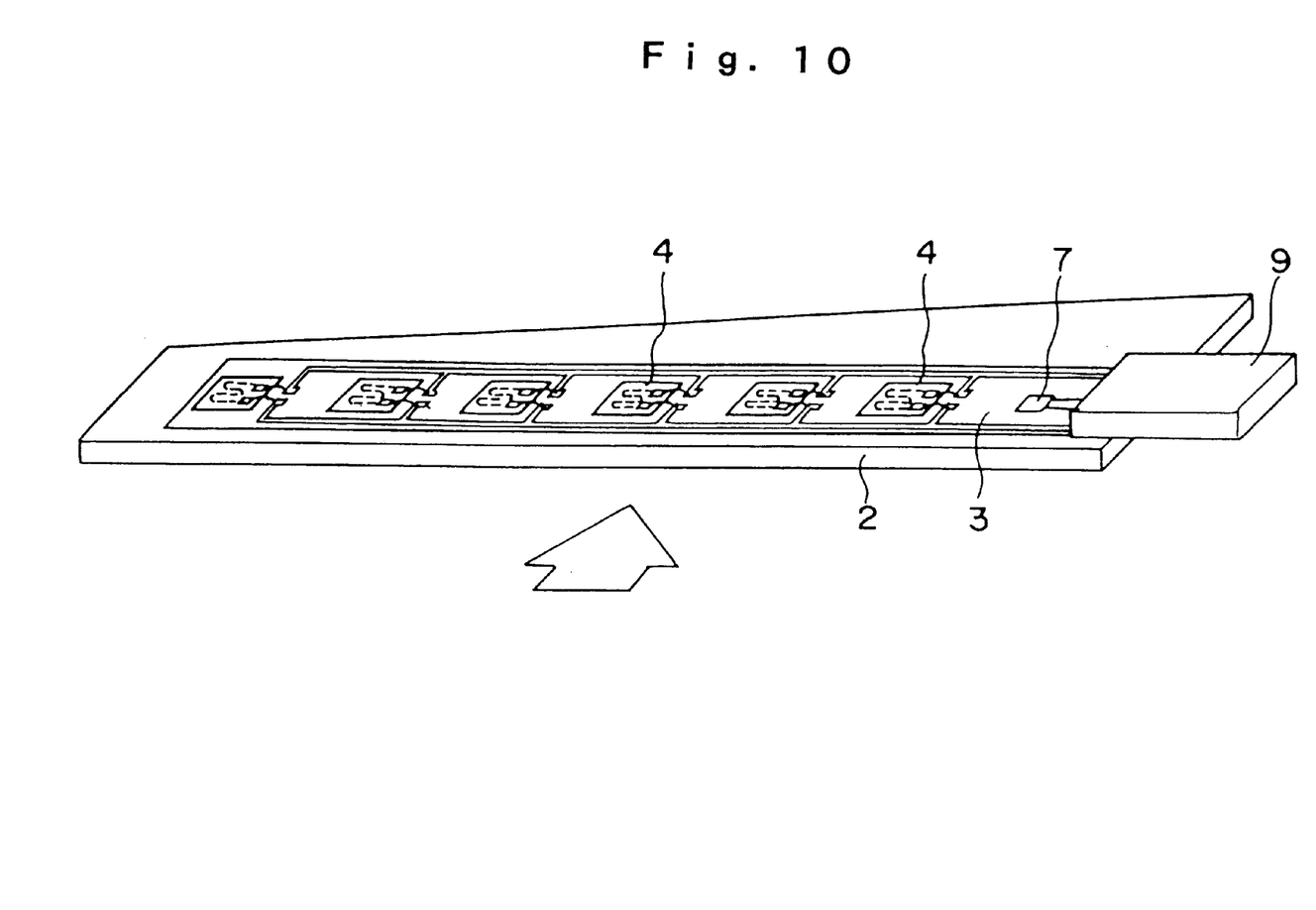
FIG. 10 is another modified support member for the flow rate detector.

In cases with a difficulty in varying the thickness of support member as shown in FIG. 9 or when any increase in pressure loss caused by a partial increase of the thickness of the support member is not acceptable, generation of a vortex and derivation of a vibration can be suppressed by varying the width of the support member 2 parallel to the flow between positions in the lengthwise direction.

Figure 11:
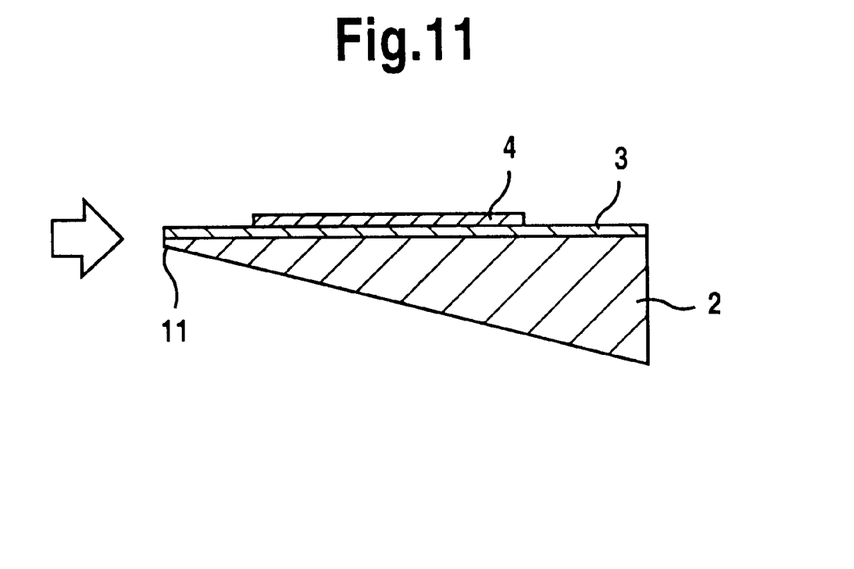
FIG. 11 is a cross-sectional view of a modified flow rate detector used in the thermal type flowmeter according to the invention.

FIG. 11 shows a cross section of another arrangement of the thermal type flow rate detector 1 taken along the axial line of a pipe conduit. In this example, the support member 2 has a wedge-shaped cross section, and its pointed end 11 is oriented to the upstream of the flow. Thus the decrease in pressure by placement of the thermal type flow rate detector 1 in the flow can be diminished.

Figure 12:
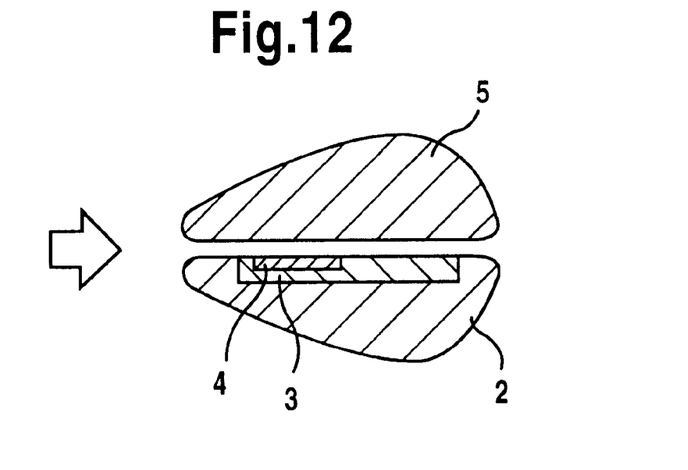
FIG. 12 is a cross-sectional view another modified flow rate detector used in the thermal type flowmeter according to the invention.

In order to restrict the pressure loss by insertion of the flow rate detector 1, it is desirable for the support member 2 to have a streamline outer configuration as shown in FIG. 12 which is a cross-sectional view of another arrangement of the thermal type flow rate detector 1 taken along the axial line of a pipe conduit. The outer configuration of the support member 2 proposed here can largely suppress the pressure loss, but causes the problem of a buoyancy applied to the support member 2. The buoyancy, however, can be canceled by configuring the protective cover 5 into an approximately symmetric streamline such that the thermal flow rate detector 1 has a vertically symmetric cross section as a whole. The glass substrate 3 and the thermal type flow rate detector elements 4 are preferably embedded in the support member 2 to exhibit a flat plane for the purpose of preventing turbulence of the flow. FIG. 12 shows an example of embedding the glass substrate 3 and the detector element 4 in the support member 2.

Figure 13:
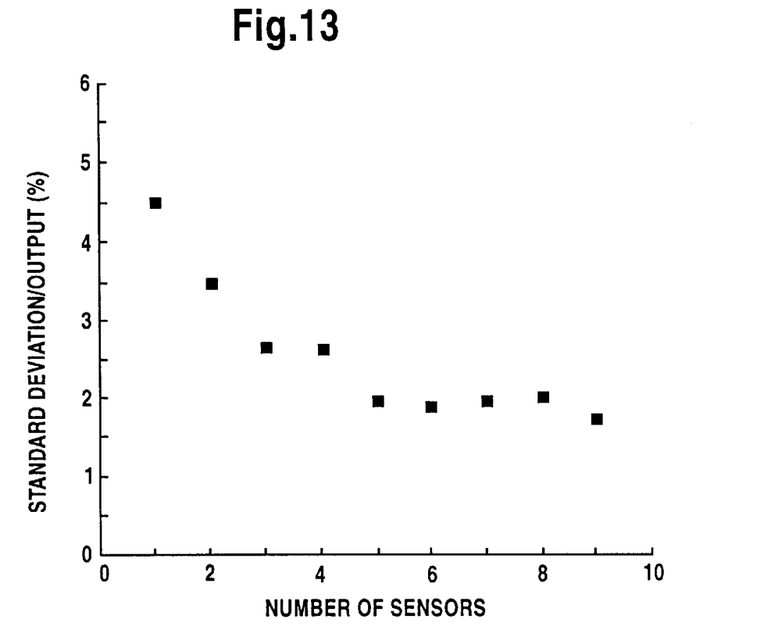
FIG. 13 is a graph showing deflections of output variation of the thermal type flowmeter according to the invention.

FIG. 13 shows the relation between numbers of flow rate detector elements (sensors) 4 and the coefficient of variation in output. The abscissa represents numbers of sensors, and the ordinate indicates ratios of outputs relative to standard deviations in percentage. These values are results of measuring a hundred times at intervals of 21 msec while flowing a fluid of 1610 m$^3$/h under the atmospheric pressure. It is acknowledged from the results of the measurement that the use of five sensors or more will limit the output variation to 2% or less.

Figure 14:
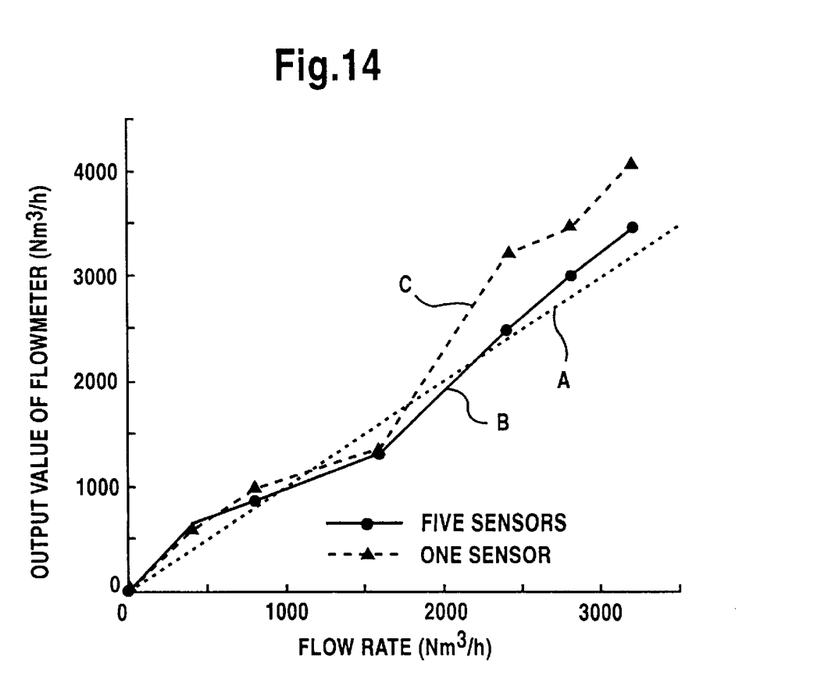
FIG. 14 is a graph showing the output variation of the thermal type flowmeter according to the invention.

FIG. 14 shows the relation actual flow amounts and measured values by using one sensor and by using five sensors. The broken line A is a line where actual flow amounts and measured values correspond by 1:1, solid line B represents measured values by using five sensors, and broken line C represents measured values by using one sensor. It is acknowledged from the figure that more accurate flow rates can be measured in ranges with larger amounts of flow by using five sensors.

Figure 15:
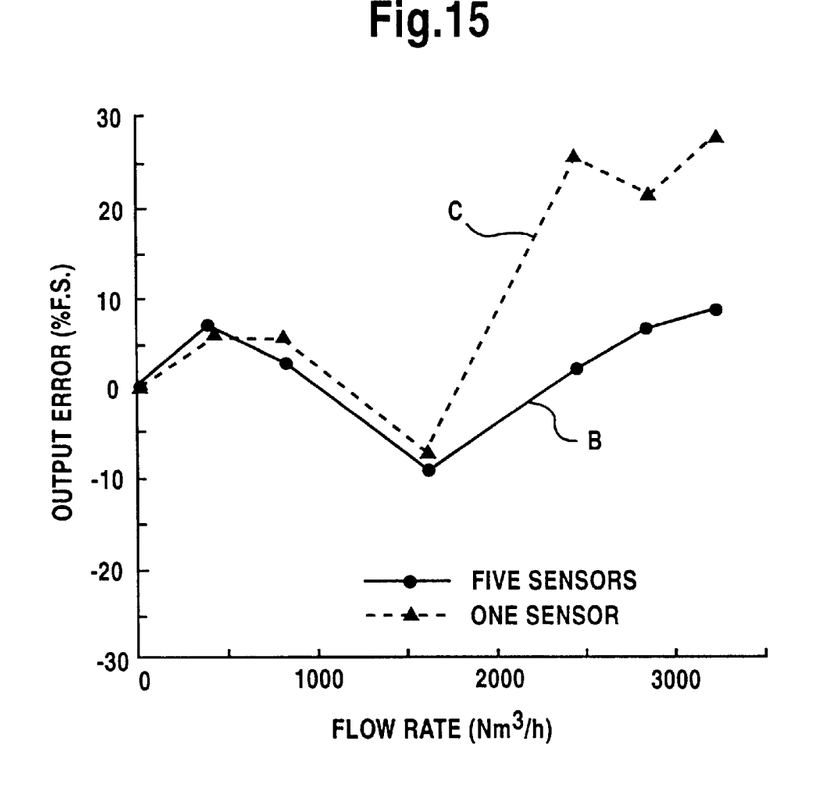
FIG. 15 is a graph showing errors in output of the thermal type flowmeter according to the invention.

FIG. 15 shows the relation between actual flow amounts and output errors by using one sensor and by using five sensors. Detection output errors by the use of five sensors, shown by the solid line B, are better than detection output errors by the use of a single sensor in the range where the flow amount is large.

Although some embodiments or examples have been described as locating the thermal type flow rate detector elements 4 in equal intervals on the support plate 2, placement of the detector elements is not limited to these examples. Instead, by placing the thermal type flow rate detector elements 4 at optimum locations according to an expected flow rate distribution, more accurate measurement of flow rates is possible.

Although each of the foregoing embodiments uses a single temperature detector element 7 independently of the thermal type flow rate detector elements 4, the temperature detector element 7 may be made simultaneously with each thermal type flow rate detector element 4 on a common substrate (on a common chip). This enables calculation of an accurate mean temperature in a pipe and a more accurate correction of the temperature by detecting temperatures of different portions even when the temperature in the pipe is not even.

Since the protective cover 5 is not necessary during measurement of flow rates, it is preferably removable such that it is held on the thermal type flow rate detector 1 during transportation and mounting process and can be removed after the thermal type flow rate detector 1 is assembled in a pipe conduit. It contributes to a reduction in pressure loss in the pipe conduit.

As described above, the flowmeter according to the invention, in comparison with existing correlative flowmeters, has advantages shown below.

(1) It is available for a wide detectable range of flow rates extending over two decimal positions or more.

(2) It has a quick response on the order of msec.

(3) Since each detector element 4 can be super-miniaturized, the cross-sectional area of the thermal type flow rate detector 1 relative to a fluid can be reduced remarkably, which leads to a small pressure loss and facilitates insertion of the detector into a pipe.

(4) Since the output voltage itself of the thermal type flow rate detector 1 is already a mean value, the circuit for converting the value into a flow amount can be simplified and miniaturized, which contributes to a significant decrease in power consumption and removes the need for a complicated signal processing circuit.

(5) Since the flow rate detector elements 4 can be mass-produced and the entire construction is simple, the flow rate detector 1 itself can be produced at a low cost.

(6) Since the output can be obtained as an electric signal, the detector can readily be coupled to a control device.

(7) When the flow rate detector elements 4 are connected in parallel, measurement of flow rates can be continued even after breakage of one or more of the sensors.

What is claimed is:

1. A thermal type flow meter, comprising:
a thermal type flow rate detector means including a plurality of thermal type flow rate detector elements mounted on a support plate, the support plate comprising a hard layer consisting of hard materials and a glass substrate formed on the metal layer wherein the hard layer has a hardness greater than said glass substrate layer;

a power source for applying power to said thermal type flow rate detector elements; and arithmetic processor means for calculating a flow amount on the basis of supplied power, wherein said support plate of the thermal flow rate detector elements include heater wires fabricated onto a semiconductor substrate, wherein said support plate of the thermal type flow rate detector means varies in thickness from one portion to another thereof, the flow meter formed so that the position of the radial center of gravity differs from the center of length in the radial direction of the flow meter.

2. The thermal type flow meter according to claim 1 wherein said support plate of the thermal type flow rate detector means varies in width parallel to a flow from one portion to another thereof, the flow meter formed so that the position of the radial center of gravity differs from the center of length in the radial direction of the flow meter.

3. The thermal type flow meter according to one of claim 1 wherein respective said thermal type flow rate detector elements are mounted in locations defined by $$r_i = R\sqrt{\frac{2i-1}{2N}} \quad (i = 1, 2, ..., N)$$

wherein $r_i$ is a distance from a center of a pipe to the thermal type flow rate detector element at the i-numbered position from the center of the pipe, R is the radius of the pipe, and N is the total number of the thermal type flow rate detector elements mounted along the radius.

4. The thermal type flow meter according to claim 1 wherein said support plate of the thermal type flow detector means has a streamline shape cross-section parallel to flow.

5. The thermal type flow meter according to claim 2 wherein said support plate of the thermal type flow detector means has a streamline shape cross-section parallel to flow.

6. The thermal type flowmeter according to claim 1 wherein said thermal type flow rate detector elements are coupled in parallel, and said power source is a constant voltage source.

7. The thermal type flowmeter according to claim 2 wherein said thermal type flow rate detector elements are coupled in parallel, and said power source is a constant voltage source.

8. The thermal type flow meter according to claim 1 wherein respective said thermal type flow rate detector elements are mounted in locations defined by $$r_i = R\sqrt{\frac{2i-1}{2N}} \quad (i = 1, 2, ..., N)$$

wherein $r_i$ is a distance from a center of a pipe to the thermal type flow rate detector element at the i-numbered position from the center of the pipe, R is the radius of the pipe, and N is the total number of the thermal type flow rate detector elements mounted along the radius.

9. The thermal type flow meter according to claim 4 wherein respective said thermal type flow rate detector elements are mounted in locations defined by $$r_i = R\sqrt{\frac{2i-1}{2N}} \quad (i = 1, 2, ..., N)$$

where $r_i$ is a distance from a center of a pipe to the thermal type flow rate detector element at the i-numbered position from the center of the pipe, R is the radius of the pipe, and N is the total number of the thermal type flow rate detector elements mounted along the radius.

10. The thermal type flow meter according to claim 1 wherein respective said thermal type flow rate detector elements are mounted in locations defined by $$r_i = R\sqrt{\frac{2i-1}{2N}} \quad (i = 1, 2, ..., N)$$

wherein $r_i$ is distance from a center of a pipe to the thermal type flow rate detector element at the i-numbered position from the center of the pipe, R is the radius of the pipe, and N is the total number of the thermal type flow rate detector elements mounted along the radius.

11. The thermal type flow meter according to claim 1 wherein respective said thermal type flow rate detector elements are mounted in locations defined by $$r_i = R\sqrt{\frac{2i-1}{2N}} \quad (i = 1, 2, ..., N)$$

where $r_i$ is a distance from a center of a pipe to the thermal type flow rate detector element at the i-numbered position from the center of the pipe, R is the radius of the pipe, and N is the total number of the thermal type flow rate detector elements mounted along the radius.

12. The thermal type flow meter according to claim 1, wherein said hard layer consists of at least one of steel, stainless steel, aluminum, duralumin, brass, copper and permalloy.

13. The thermal type flow meter according to claim 1, wherein said hard layer consists of at least one of ceramics, hard plastics, silicon nitride and carbon.

\* \* \* \* \*